(12) United States Patent
Tada (10) Patent No.: US 7,240,825 B2
(45) Date of Patent: Jul. 10, 2007

(54) TAPE CARTRIDGE

(75) Inventor: Nobuyuki Tada, Odawara (JP)

(73) Assignee: Fujifilm Corporation, Tokyo (JP)

( * ) Notice: Subject to any disclaimer, the term of this patent is extended or adjusted under 35 U.S.C. 154(b) by 241 days.

(21) Appl. No.: 10/983,804

(22) Filed: Nov. 9, 2004

(65) Prior Publication Data

US 2005/0133583 A1 Jun. 23, 2005

(30) Foreign Application Priority Data

Dec. 17, 2003 (JP) .............................. 2003-419892

(51) Int. Cl.
*G06F 17/00* (2006.01)
(52) U.S. Cl. ..................... 235/375; 235/439; 235/451
(58) Field of Classification Search ................ 235/492, 235/375, 440, 439, 451
See application file for complete search history.

(56) References Cited

U.S. PATENT DOCUMENTS

| | | | | |
|---|---|---|---|---|
| 5,034,904 | A * | 7/1991 | Moy ........................... | 700/259 |
| 5,610,789 | A * | 3/1997 | Miller ......................... | 360/132 |
| 5,971,281 | A * | 10/1999 | Frary et al. .................. | 235/487 |
| 6,065,701 | A * | 5/2000 | Tanimura et al. ............ | 242/344 |
| 6,201,474 | B1 * | 3/2001 | Brady et al. ............. | 340/572.8 |
| 6,299,088 | B1 * | 10/2001 | Rambosek ................... | 242/347 |
| 6,304,416 | B1 * | 10/2001 | McAllister et al. .......... | 360/132 |
| 6,466,990 | B2 * | 10/2002 | Frary .......................... | 719/310 |
| 6,481,658 | B1 * | 11/2002 | Shiga et al. ................. | 242/347 |
| 6,817,563 | B2 * | 11/2004 | Iino ............................. | 242/348 |
| 7,064,926 | B2 * | 6/2006 | Kitamura et al. ............ | 360/132 |
| 7,079,346 | B2 * | 7/2006 | Jerman ........................ | 360/69 |
| 7,079,978 | B2 * | 7/2006 | Goodman et al. ........... | 702/182 |

FOREIGN PATENT DOCUMENTS

JP          2003-297040 A          10/2003

* cited by examiner

*Primary Examiner*—Ahshik Kim
(74) *Attorney, Agent, or Firm*—Sughrue Mion, PLLC (57) ABSTRACT

Disclosed is a tape cartridge which contributes to shorten the time for sensing an RFID tag in the tape cartridge itself, and which makes it possible to sense the condition of the RFID tag. The tape cartridge includes a tape-shaped recording medium, an RFID tag for storing management information about the tape-shaped recording medium, a cartridge case containing the tape-shaped recording medium and the RFID tag, and an RFID tag sensing means making it possible to sense present of the RFID tag, the RFID tag sensing means being set in the cartridge case. In addition, the RFID tag sensing means includes two light-transmitting components for passing light therethrough, which are placed on a top surface of an upper half case of the cartridge case and on a bottom surface of a lower half case of the cartridge case, respectively, in alignment with the RFID tag.

21 Claims, 5 Drawing Sheets

TAPE CARTRIDGE

BACKGROUND OF THE INVENTION

1. Field of the Invention

An apparatus consistent with the present invention relates to a tape cartridge and, especially to a magnetic tape cartridge containing a tape-shaped recording medium. More specifically, an apparatus consistent with the present invention relates to a magnetic tape cartridge which makes it possible to sense the presence of an RFID tag within.

2. Description of the Related Art

Magnetic tape cartridges have been widely used as mass storage media. Such magnetic tape cartridges, however, have a structure that a single magnetic tape contains data, and their access time inevitably ends up being long. To overcome this disadvantage, a non-contact type of IC tag that functions as an automatic identifying means using radio waves or magnetic coupling has been produced, and a magnetic tape cartridge equipped with this IC tag has become popular. Hereinafter, an IC tag is referred to as "RFID (radio frequency identification) tag". Such an RFID tag is a medium on/from which information about the location of the data on the magnetic tape, production management of the magnetic tape cartridge, etc. can be written or read, and allows the access time for the magnetic tape cartridge to be short.

Concretely, an RFID tag includes within an IC chip that stores management information about the data recorded on the magnetic tape, and an antenna or a coil. Further, the RFID tag can communicate with an RFID reader/writer by means of radio waves or magnetic coupling in a non-contact manner (see a reference numeral 9 in FIG. 1). Furthermore, when certain data needs to be read from a magnetic tape cartridge, the management information about this data can be read from the RFID tag, so that the location of the data can instantly be pinpointed. Consequently, it is possible to access a magnetic tape cartridge efficiently.

As for the procedures of reading data from the magnetic tape cartridge with an RFID tag, the RFID reader/writer is first activated, then refers to the management information recorded on the RFID tag, and the data is finally read from the magnetic tape, based on the information. In addition, when new data is written on the magnetic tape, the RFID reader/writer writes, on the RFID tag, the management information about the new data. Furthermore, an RFID reader/writer senses the presence of an RFID tag. Concretely, an RFID reader/writer sends a command to an RFID tag, and then waits for a response from the RFID tag. The RFID reader/writer determines whether the RFID tag is present, based on the presence or absence of the response.

An RFID tag has conventionally been integrated into a cartridge, but recently, for the purpose of facilitating the exchange of RFID tags, a magnetic tape cartridge from which an RFID tag can be detached was disclosed (see Japanese Unexamined Patent Application No. 2003-297040). In this structure, an RFID tag is fixed to a block body separate from a cartridge, and this block body is inserted into an aperture in the cartridge. Moreover, a label type of RFID tag which can be affixed on the back of a cartridge was also proposed. This RFID tag can be attached/detached to or from a cartridge as appropriate.

However, in an RFID tag as in the examples above, problems may occur, such as the positional relationship between an RFID tag and an RFID reader/writer is not optimum, or the performances of them are quite different from each other. In these cases, the RFID reader/writer may fail to identify the RFID tag, or may spend a long time to search for the RFID tag. These disadvantages may also appear when the specifications between the RFID tag and the RFID reader/writer are mismatched.

An RFID tag of this type may be damaged when being attached/detached to or from the magnetic tape cartridge. In this case, the disadvantages above may also occur.

The present invention has been conceived, taking the disadvantages above into account. An object of the present invention is to provide a magnetic tape cartridge with an arrangement which makes it possible to sense the presence of an RFID tag, with or without an RFID reader/writer, thereby shortening the time to search for the RFID tag.

An additional object of the present invention is to provide a means for sensing, by working with an RFID reader/writer, the presence, condition, etc. of an RFID tag having various specifications.

SUMMARY OF THE INVENTION

According to an aspect of the present invention, there is provided, a tape cartridge includes:
(a) a tape-shaped recording medium;
(b) an RFID tag for storing management information about the tape-shaped recording medium;
(c) a cartridge case containing the tape-shaped recording medium and the RFID tag; and
(d) an RFID tag sensing means making it possible to sense present of the RFID tag, the RFID tag sensing means being placed in the cartridge case.

Herein, the term "management information" represents manufacture or usage historical information about the tape cartridge, information about a location of data on the magnetic tape, or the like, for example. By containing this management information on the RFID tag, the various operations of the magnetic tape can be made more efficient than a case where the magnetic tape contains the management information on its specific region. In other words, by containing this management information on the RFID tag, the need for writing the management information on the magnetic tape or for running the magnetic tape to read the management information therefrom is eliminated.

The RFID tag sensing means includes two light-transmitting components for passing light therethrough, which are placed on a top surface of an upper half case of the cartridge case and on a bottom surface of a lower half case of the cartridge case, respectively, in alignment with the RFID tag.

In this structure above, the presence of the RFID tag can be easily sensed by use of an external photosensor unit.

Alternatively, the RFID tag sensing means includes two light-transmitting components placed on a top surface of an upper half case of the cartridge case or on a bottom surface of a lower half case of the cartridge case, and on a side of the cartridge case, respectively, in alignment with the RFID tag. Further, the RFID tag is made of a base material with a reflectance ratio of at least 0.7.

Further, in this structure above, especially when the light-transmitting components are placed on the bottom surface of the lower half case and on the side of the cartridge case, respectively, the RFID tag is inclined down 45 degrees toward the front of the cartridge case.

Alternatively, the RFID tag sensing means includes a light-transmitting component placed on a top, bottom or side surface of the cartridge case, and the RFID tag is set parallel to the light-transmitting component.

The RFID tag is formed of a material with a low reflectance ratio of, for example, at most 0.3, and the interior material of the cartridge case, in particular, the portion for supporting the RFID tag is made of a material with a high reflectance ratio of, for example, at least 0.7.

Alternatively, the RFID tag sensing means is an opening, recess or protrusion indicating that the RFID tag is set, which is provided on a predetermined portion of the cartridge case.

In this structure above, the presence of the RFID tag can be easily sensed by use of a sensor for an opening, recess or protrusion, as with the case where the light-transmitting component(s) is/are used.

Alternatively, the RFID tag sensing means is a predetermined portion which is positioned on a back label or on a surface of the cartridge case and which is colored in black or in a specific color, or it may be a reflective material placed thereon.

In this case, the reflective material includes reflective seal and seat.

In this structure above, the presence of the RFID tag can also be easily sensed by use of an external photosensor unit.

The provision of the colored or reflective portion is appropriately utilized, especially when the back label and the RFID tag are integrated into a single piece.

Alternatively, the RFID tag sensing means is a conductive material placed on a back label or on a surface of the cartridge case.

The conductive material includes conductive seal and seat. In this structure above, the presence of the RFID tag can also be easily sensed by use of a continuity tester.

According to another aspect of the present invention, there is provided, a method for confirming condition of the RFID tag in the tape cartridge, including:

(a) a first step for confirming whether the RFID tag is present, with the RFID tag sensing means;
(b) a second step for confirming whether the RFID tag is present, with an RFID reader/writer;
(c) a third step for comparing results of the first and second steps; and
(d) a fourth step for determining, based on a result of the third step, whether the RFID tag is present, and whether the RFID tag fails or whether the RFID tag has specifications different from those of the RFID reader/writer.

According to further aspect of the present invention, there is provided, a method for confirming condition of the RFID tag in the tape cartridge, including:

(a) a first step for confirming whether the RFID tag is present, with the RFID tag sensing means;
(b) a second step for confirming whether the RFID tag is present, with an RFID reader/writer; and
(c) a third step for comparing results of the first and second steps and, when the results are different from each other, for determining that the RFID tag fails or has specifications different from those of the RFID reader/writer.

In conclusion, by providing the magnetic tape cartridge equipped with the RFID tag sensing means and the method for confirming condition of the RFID tag in the tape cartridge, which are both according to the present invention, it is possible to determine whether the RFID tag is set in the cartridge, with or without the RFID reader/writer, as well as to confirm, by working with the RFID reader/writer, the condition, etc. of the RFID tag having various specifications, thereby shortening the time for searching the RFID tag.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

Figure 1:
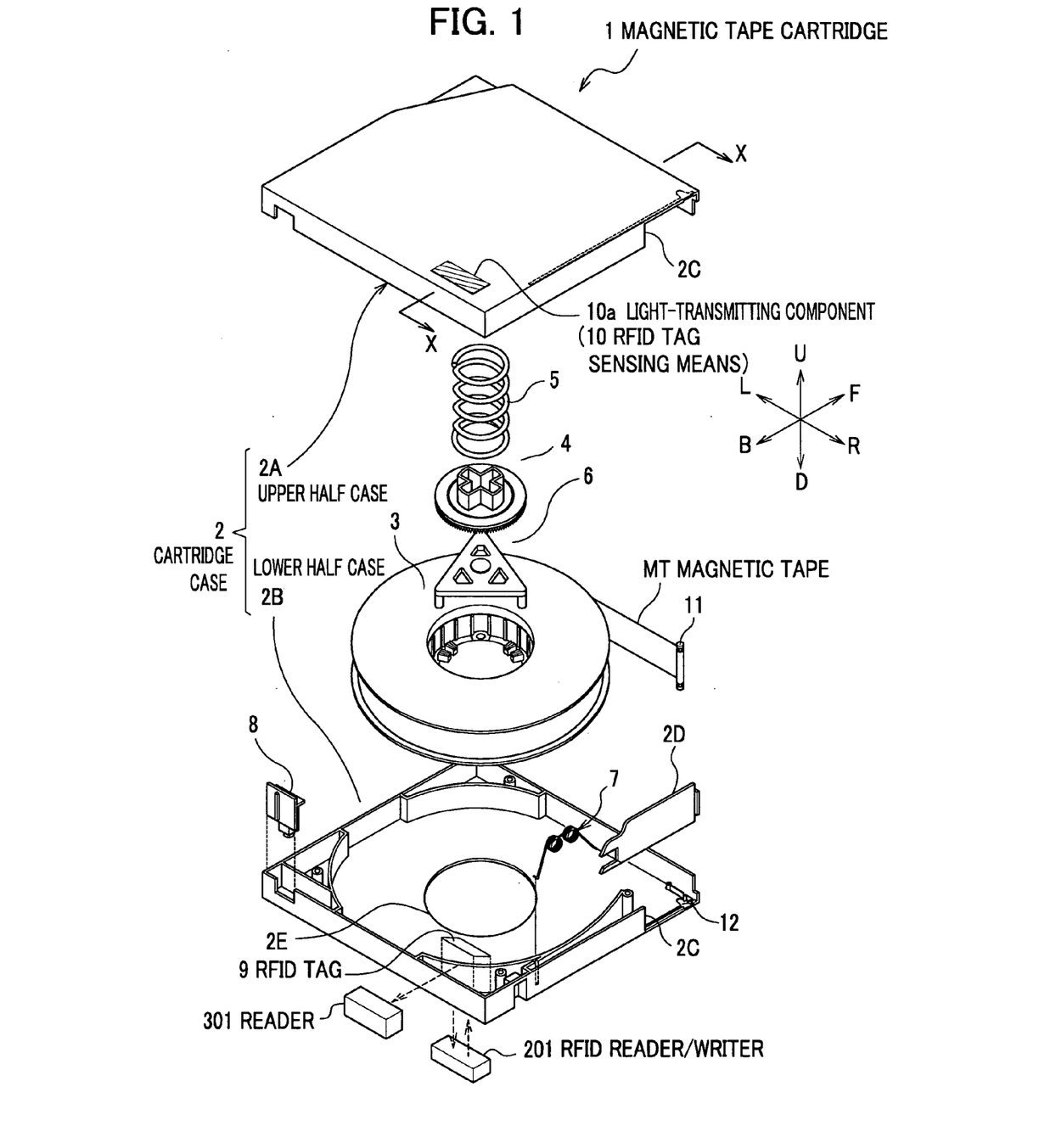
FIG. 1 is an exploded perspective view depicting a magnetic tape cartridge equipped with an RFID tag sensing means according to a first embodiment of the present invention.
Figure 2:
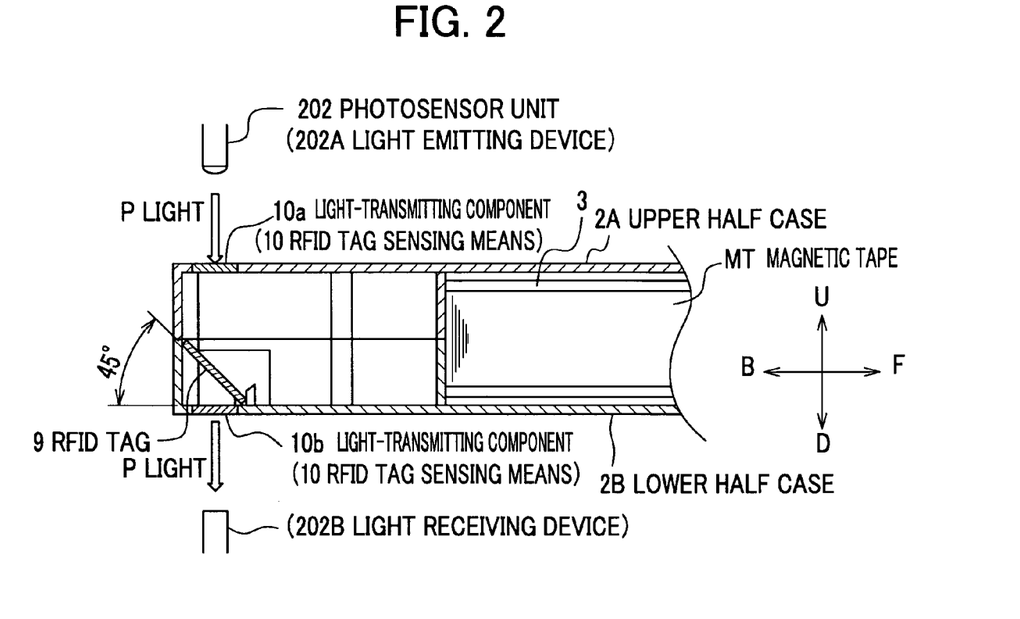
FIG. 2 is an enlarged cross-sectional view taken along a line X—X of the main portion of FIG. 1.
Figure 3:
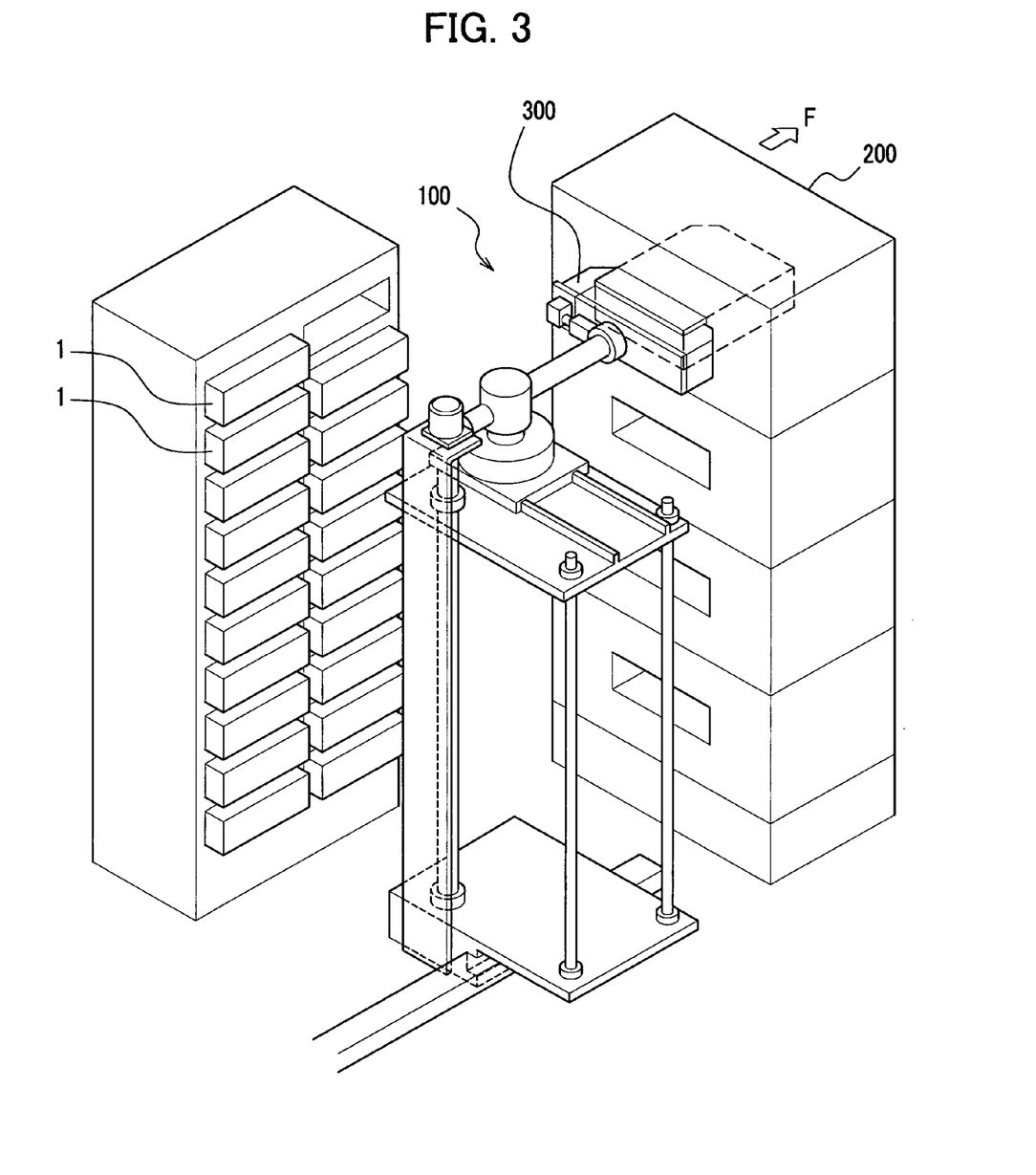
FIG. 3 is a schematic view depicting a library containing the magnetic tape cartridges.

Description will be given below in detail of an RFID tag sensing means of a magnetic tape cartridge according to embodiments of the present invention, with reference to accompanying figures as appropriate. FIG. 1 is an exploded perspective view depicting a magnetic tape cartridge equipped with an RFID tag sensing means according to a first embodiment of the present invention; FIG. 2 is an enlarged cross-sectional view taken along a line X—X of the main portion of FIG. 1; and FIG. 3 is a schematic view depicting a library including the magnetic tape cartridges. In following description and figures, the directions of "front", "back", "up", "down", "left" and "right" correspond to those of F, B, U, D, L and R shown in FIG. 1, respectively. In addition, a direction in which a magnetic tape cartridge is loaded into a drive is denoted by F.

First Embodiment (Arrangement)

A description will be given below of a magnetic tape cartridge equipped with an RFID tag sensing means according to a first embodiment of the present invention, with reference to FIGS. 1 and 2. Referring to FIG. 1, the upper right direction (direction F) denotes a direction in which a magnetic tape cartridge 1 is loaded into a drive 200 (see FIG. 3). Referring to FIG. 2, the right direction (direction F) denotes the direction in which the magnetic tape cartridge 1 is loaded into the drive 200. The magnetic tape cartridge 1 shown in FIG. 1 is compliant with the LTO (Linear Tape-Open) standard, and includes, as main components:

(a) a cartridge case 2 composed of upper and lower half cases 2A and 2B;
(b) a magnetic tape MT;
(c) a single reel 3 around which the magnetic tape MT is wound;
(d) a reel lock 4 and a compressed coil spring 5 which both maintain the lock of the reel 3;
(e) a release pad 6 which releases the lock of the reel 3;
(f) a magnetic tape drawer opening 2C formed on the side of each of the upper and lower half cases 2A and 2B;
(g) a slide door 2D which opens/closes the magnetic tape drawer opening 2C;
(h) a torsion coil spring 7 which urges the slide door 2D in the direction where the magnetic tape drawer opening 2C is closed;
(i) a safety lug 8;
(j) an RFID tag 9;
(k) a light-transmitting component 10a which is formed on the upper half case 2A and which serves as an RFID tag sensing means 10;
(l) a light-transmitting component 10b (not shown in FIG. 1) formed on the lower half case 2B in alignment with the light-transmitting component 10a; and
(m) a reader pin receiving portion 12 formed near the magnetic tape drawer opening 2C.

The drive 200 (see FIG. 3), into which the magnetic tape cartridge 1 is to be loaded, draws out the reader pin 11 through the magnetic tape drawer opening 2C on the side of the cartridge case 2 and, then winds the magnetic tape MT from the reel 3. Simultaneously, the drive 200 rotatably drives a hub (not shown) of the reel 3 through an aperture 2E formed on the bottom of the lower half case 2B and, then rewinds the magnetic tape MT around the reel 3. This enables the magnetic tape MT to be recorded/reproduced.

The RFID tag 9 is inclined down 45 degrees toward the front of the magnetic tape cartridge 1, as shown in FIGS. 1 and 2. This RFID tag 9 electrically stores the management information about the type, memory capacity, etc. of the magnetic tape MT, and can store additional information.

Thanks to the inclination of the RFID tag 9, a reader 301 (see FIG. 1) that is provided on a robot finger 300 of a library 100 shown in FIG. 3 and behind the magnetic tape cartridge 1 can read the management information from the RFID tag 9. Furthermore, the RFID reader/writer 201 (see FIG. 1) below the magnetic tape cartridge 1 can communicate with the RFID tag 9 by means of radio waves or magnetic coupling to thereby read/write information therefrom or thereon in a non-contact manner.

The position of the RFID tag 9 is not limited to the back of the magnetic tape cartridge 1 with respect to the direction F, but may be any position, such as the left side of the magnetic tape cartridge 1 with respect to the direction F, as long as being other than the position around the magnetic tape drawer opening 2C. In this embodiment, a reader 301 is provided on the robot finger 300, but may be provided in the drive 200 instead. In addition, the RFID reader/writer 201 is provided in the drive 200 in this embodiment, but may be provided on the robot finger 300 instead.

The magnetic tape cartridge 1 has the light-transmitting components 10a and 10b, as the RFID tag sensing means 10, on the upper and lower half cases 2A and 2B, respectively, as shown in FIG. 2. Accordingly, a photosensor unit 202 senses the presence of the RFID tag 9 when the magnetic tape cartridge 1 is loaded into the drive 200, so that the drive 200 can determine whether the RFID tag 9 is set. This photosensor unit 202 includes a light emitting device 202A and a light receiving device 202B. In this embodiment, the light emitting device 202A above the magnetic tape cartridge 1 first emits light P toward the light-transmitting component 10a, the light P then passes through the magnetic tape cartridge 1, and the light-receiving device 202B below the magnetic tape cartridge 1 finally receives the light P. As a result, the presence of the RFID tag 9 can be sensed.

The light P may be visible light (wavelength of about 380 nm to 780 nm) or infrared light (wavelength of about 780 nm to 1 nm), and can also be ultraviolet light (wavelength of about 1 nm to 380 nm). The RFID tag 9 must be made of a material through which the light P of the wavelength above does not pass. It is preferable that the light-transmitting components 10a and 10b are formed of a resin which does not absorb and reflect the light P and which has transmittance of no less than 60%. As an example of such a resin, a polycarbonate (PC) resin can be used.

(RFID Tag Confirmation Process)

In the magnetic tape cartridge 1 according to the first embodiment of the present invention, two confirmation steps are performed; one step is to confirm whether the RFID tag 9 is present by use of the light P; and the other is to confirm whether the RFID reader/writer 201 can read the management information from the RFID tag 9. Subsequently, the results of these two confirmation steps are compared, so that it can be confirmed whether the RFID tag 9 fails, or whether the specifications between the RFID tag 9 and the RFID reader/writer 201 are matched. A description will be given below of a process for confirming whether the RFID tag 9 fails (RFID tag confirmation process), with reference to FIGS. 1 to 3 as appropriate. In this description, the upper right direction in FIG. 3 corresponds to a direction in which the magnetic tape cartridge 1 is loaded (F direction).

Once the magnetic tape cartridge 1 is loaded into the drive 200, the photosensor unit 202, that is, both the light emitting device 202A and the light receiving device 202B (see FIG. 2) in the drive 200 are activated. The active light emitting device 202A emits light P toward the light-transmitting components 10a and 10b (RFID tag sensing means 10), and the presence of the RFID tag 9 is then sensed based on whether the light receiving device 202B receives the light P (first process). In this case, if the light receiving device 202B below the cartridge case 2 (i.e. below the light-transmitting component 10b) does not receive the light P traveling from the upper portion of the cartridge case 2, the sense result is that the RFID tag 9 is present. Otherwise, if does, then the sense result is that the RFID tag 9 is absent.

Next, the RFID reader/writer 201 is activated and, then tries to communicate with the RFID tag 9 in order to check the presence of the RFID tag 9 (second process).

The results of the first and second processes are then compared (third process). As a result, it is determined whether the RFID tag 9 is set, and it is further determined whether the RFID tag 9 fails (fourth process).

Note that the first and second processes may naturally be performed in the opposite order, or at the same time.

In conclusion, a following determination is obtained based on the result of the RFID tag confirmation process composed of the first to fourth processes.

Note that, in the first process, if the presence of the RFID tag 9 is confirmed, then the result is "OK 1", otherwise "NG 1". Similarity, in the second step, if the communication with the RFID tag 9 is possible, then the result is "OK 2", otherwise "NG 2".

(A) The Results are "OK 1" and "OK 2"

It is decided that the RFID tag 9 is normally set. The RFID reader/writer 201 reads the management information from the RFID tag 9, and the drive 200 then reads data from the magnetic tape MT, based on the information read. In this case, thanks to the information from the RFID tag 9, the access time for reading desired data can be greatly shortened. In addition, if a user determines whether the data on the magnetic tape cartridge 1 is necessary, then the user can decide it more quickly than the case without the management information.

(B) The Results are "OK 1" and "NG 2"

It is decided that the RFID tag 9 is set, but it fails or it is not set correctly, or the specifications between the RFID tag 9 and the RFID reader/writer 201 are mismatched. In this case, it is preferable that the warning of failure, etc. of the RFID tag 9 is given to a user through a display (not shown) connected to the drive 200.

(C) The results are "NG 1" and "OK 2"

It is decided that the magnetic tape cartridge 1 is of a conventional type to which the present invention is not applied. In this case, the RFID reader/writer 201 reads the management information from the RFID tag 9.

(D) The results are "NG 1" and "NG 2"

It is decided that the RFID tag 9 is not set or fails, and the magnetic tape cartridge 1 is of a conventional type. In this case, the reader/writer 201 does not read the management information from the RFID tag 9, but the drive 200 reads data from the magnetic tape MT.

Up to this point, the magnetic tape cartridge according to the first embodiment of the present invention has been described. However, the present invention is not limited to this embodiment, and various modifications and variations can be conceived.

Description will be given below of an RFID tag sensing means of a magnetic tape cartridge according to other embodiments of the present invention.

Figure 4A:
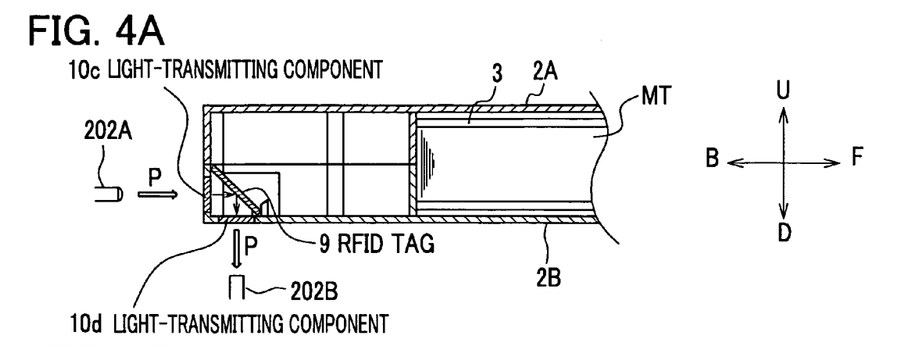
FIG. 4A is a longitudinal sectional-view depicting main components of an RFID tag sensing means of a magnetic tape cartridge according to a second embodiment.
Figure 4B:
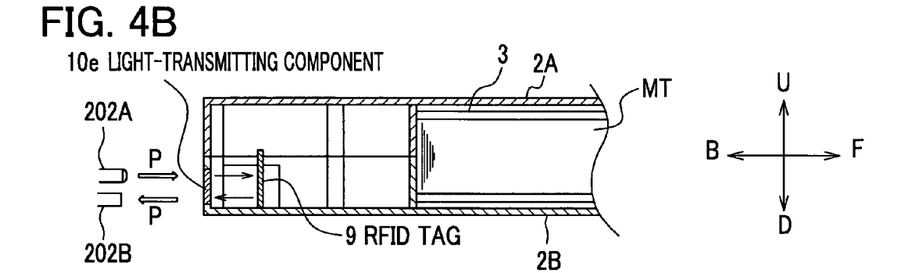
FIG. 4B is a longitudinal sectional-view depicting main components of an RFID tag sensing means of a magnetic tape cartridge according to a third embodiment.
Figure 4C:
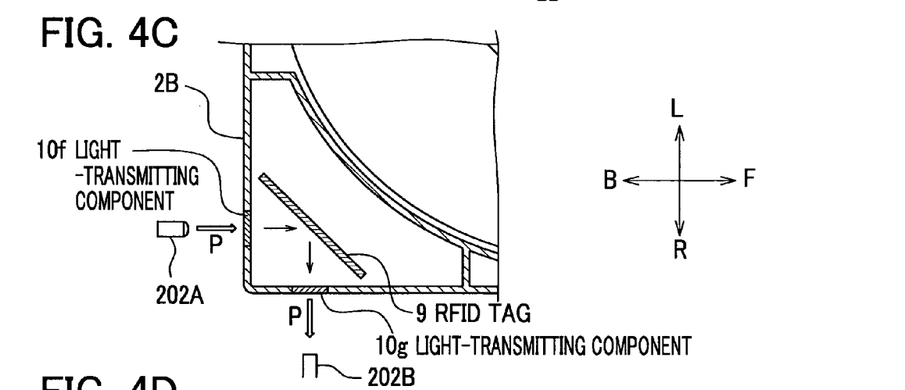
FIG. 4C is a longitudinal sectional-view depicting main components of an RFID tag sensing means of a magnetic tape cartridge according to a fourth embodiment.
Figure 4D:
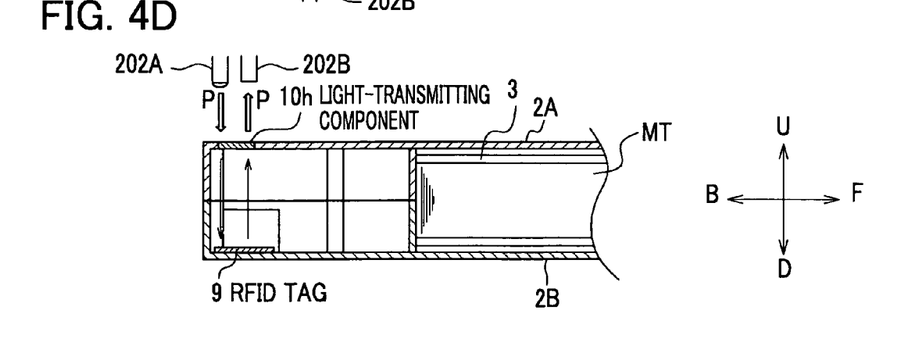
FIG. 4D is a longitudinal sectional-view depicting main components of an RFID tag sensing means of a magnetic tape cartridge according to a fifth embodiment.
Figure 5A:
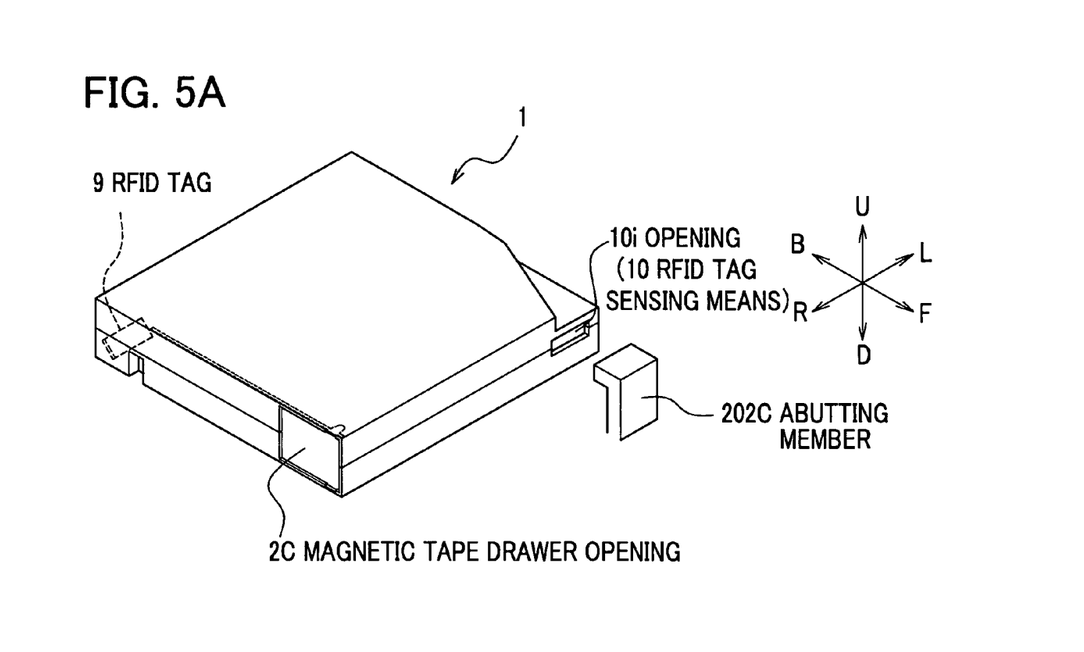
FIG. 5A is a perspective view depicting a magnetic tape cartridge according to a sixth embodiment.
Figure 5B:
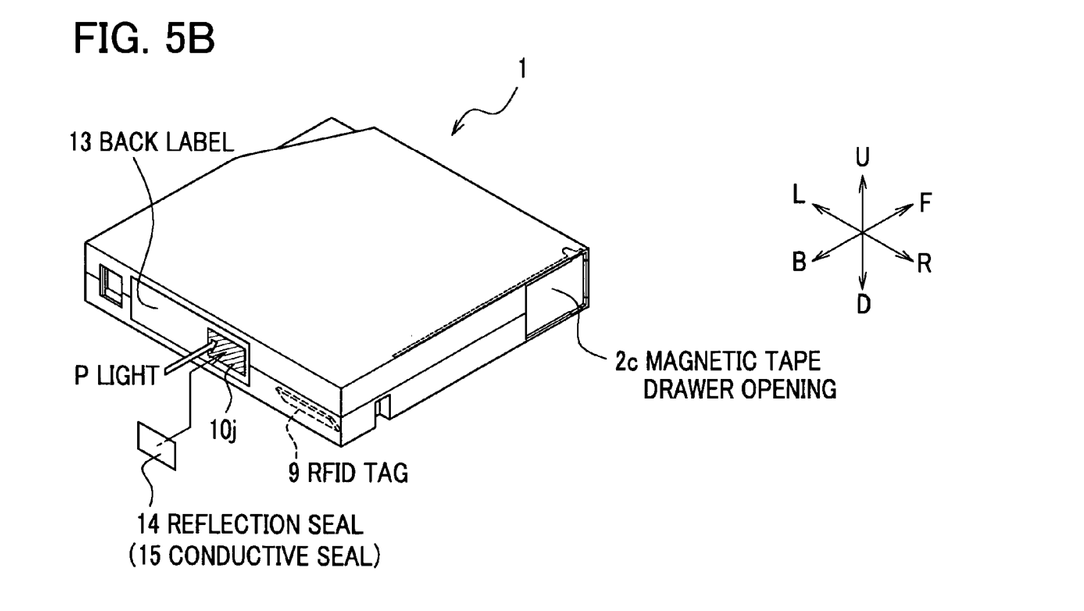
FIG. 5B is a perspective view depicting a magnetic tape cartridge according to seventh and eight embodiments.

FIG. 4A is a longitudinal sectional-view depicting main components of an RFID tag sensing means of a magnetic tape cartridge according to a second embodiment; FIG. 4B is a longitudinal sectional-view depicting main components of an RFID tag sensing means of a magnetic tape cartridge according to a third embodiment; FIG. 4C is a longitudinal sectional-view depicting main components of an RFID tag sensing means of a magnetic tape cartridge according to a fourth embodiment; FIG. 4D is a longitudinal sectional-view depicting main components of an RFID tag sensing means of a magnetic tape cartridge according to a fifth embodiment; FIG. 5A is a perspective view depicting a magnetic tape cartridge according to a sixth embodiment; and FIG. 5B is a perspective view depicting a magnetic tape cartridge according to seventh and eight embodiments.

In FIGS. 4A to 4D, the right direction in the figures corresponds to the direction in which the magnetic tape cartridge 1 is loaded into the drive 200 (direction F). In FIG. 5A, the lower right direction corresponds to a direction in which the magnetic tape cartridge 1 is loaded into the drive 200 (direction F). In FIG. 5B, the upper right direction corresponds to a direction in which the magnetic tape cartridge 1 is loaded into the drive 200 (direction F).

In a following description, since arrangements of the magnetic tape cartridges according to the second to eighth embodiments are similar to that of the first embodiment, duplicate parts will be omitted.

RFID tag confirmation processes in the second to eighth embodiments, as will be described later, are similar to that of the first embodiment. Specifically, they are each constituted of a step by which the drive 200 senses the presence of the RFID tag 9 by use of the RFID tag sensing means 10 (first process), a step by which the RFID reader/writer 201 checks the presence of the RFID tag 9 (second process), a step by which the results of the first and second processes are compared (third process), and a step by which it is determined whether the RFID tag 9 fails, based on the result of the third process. As a result, the condition of the RFID tag 9 is confirmed.

Second Embodiment

The magnetic tape cartridge 1 according to the second embodiment includes, as main components:
(a) the RFID tag sensing means 10 constituted of light-transmitting components 10c and 10d arranged on the side and bottom of the lower half case 2B, respectively; and
(b) the RFID tag 9 made of a material of a high reflectance ratio and inclined down 45 degrees in the direction F, as shown in FIG. 4A.

Specifically, the components of the RFID tag sensing means 10 are placed on the surfaces adjacent to each other, respectively. The light P passes through one of the surfaces, then reflects the RFID tag 9, and passes through the other surface.

The light P is emitted from the light emitting device 202A, then reaches the RFID tag 9 through the light-transmitting component 10c. Further, the light P is bent at a substantial right angle by reflecting the RFID tag 9. Subsequently, the light P passes through the light-transmitting component 10d, and is then received by the light receiving device 202B in the drive 200. In this way, if the light P reflected on the RFID tag 9 is received by the light receiving device 202B, then the result is that the RFID tag 9 is present. Meanwhile, if the RFID tag 9 is absent, then the light P is not received. The result that the RFID tag 9 is absent is hence required.

A variation of the RFID tag sensing means 10 according to the second embodiment can be conceived as follows. The RFID tag 9 made of a material of a high absorption ratio is provided, and a plate-shaped member (not shown) of a high reflectance ratio for supporting the RFID tag 9 is placed parallel to the RFID tag 9 in the cartridge case 2. In this variation, when the RFID tag 9 is set, then the light P is absorbed by the RFID tag 9 and, therefore is not received by the light receiving device 202B. Consequently, the result that the RFID tag 9 is present is acquired.

Otherwise, if the RFID tag 9 is not set in the magnetic tape cartridge 1, then the light P from the light emitting device 202A is bent at a substantial right angle by reflecting the plate-shaped member. Subsequently, the light P passes through the light-transmitting component 10d, and is finally received by the light receiving device 202B. Consequently, the result that the RFID tag 9 is absent is acquired.

It is preferable that the reflectance ratios of the RFID tag 9 and of the interior of the cartridge case 2 are adjusted in proportion to each other. For example, when the reflectance ratio of the RFID tag 9 is made high, the inner surface of the cartridge case 2 may be made low by being roughened up or by affixing thereon a member or a tape of a low reflectance ratio. Meanwhile, when the reflectance ratio of the RFID tag 9 is made low, the inner surface of the cartridge case 2 may be processed to have a high reflectance ratio. With these arrangements, the difference of the reflectance ratios in the magnetic tape cartridge 1 with and without the RFID tag 9 is enhanced, thereby reducing the possibility of sensing error.

Note that, in order to increase the reflectance ratio of the RFID tag 9 or the plate-shaped member, a resin of a wavelength dependent reflectance ratio may be used, or a molded resin is made to undergo mirror-finish. Meanwhile, to decrease the reflectance ratio, a resin of a wavelength dependent transmittance ratio may be used, or a molded resin is made to undergo embossing. Alternatively, the reflectance ratio may be adjusted by applying a resin coating.

Third Embodiment

The magnetic tape cartridge 1 according to the third embodiment includes, as main components:
(a) the RFID tag sensing means 10 constituted of a light-transmitting component 10*e* provided on the rear edge of the cartridge case 2 (i.e. on the rear edge of the lower half case 2B in FIG. 4B) in the direction B; and
(b) the RFID tag 9 is placed parallel to the light-transmitting component 10*e*, as shown in FIG. 4B.

Specifically, the RFID tag sensing means 10 is provided on one surface of the cartridge case 2, and the RFID tag 9 is placed parallel to the one surface.

The light P from the light emitting device 202A passes through the light-transmitting component 10*e* on the rear edge of the cartridge case 2, then reflects the RFID tag 9, and passes through the light-transmitting component 10*e* again. Finally, the light P is received by the light receiving device 202B. If the light P is received, then the result is that the RFID tag 9 is present and, otherwise if not, then the result is that the RFID tag 9 is absent.

Fourth Embodiment

The magnetic tape cartridge 1 according to the fourth embodiment includes, as main components:
(a) the RFID tag sensing means 10 constituted of light-transmitting components 10*f* and 10*g* on the rear edge and the right edge, respectively, in the direction F; and
(b) the RFID tag 9 inclined 45 degrees in the direction F (inclined down in this figure), as shown in FIG. 4C.

In this embodiment, the light P from the light emitting device 202A passes through the light-transmitting component 10*f* on the rear edge of the lower half case 2B, and is then bent at a substantial 90 degrees by reflecting the RFID tag 9. Sub-sequently, the light P passes through the light-transmitting component 10*g* on the right side of the cartridge case 2, and is finally received by the light receiving device 202B. Consequently, if the light P is received, then the result is that the RFID tag 9 is present and, otherwise if not, then the result is that the RFID tag 9 is absent.

Fifth Embodiment

The magnetic tape cartridge 1 according to the fifth embodiment includes, as main components:
(a) the RFID tag sensing means 10 constituted of a light-transmitting component 10*h* provided on the top surface of the upper half case 2A; and
(b) the RFID tag 9 made of a material of a high reflectance ratio, which is placed on the lower half case 2B and parallel to the top surface of the upper half case 2A, as shown in FIG. 4D.

As with the embodiments above, with the light P from the light emitting device 202A, the present of the RFID tag 9 can be sensed.

In this embodiment, the light P from the light emitting device 202A passes through the light-transmitting component 10*h* on the top surface of the upper half case 2A, and then returns toward the light emitting device 202A by reflecting on the RFID tag 9. Subsequently, the light P passes the light-transmitting component 10*h* again, and is finally received by the light receiving device 202B. Consequently, if the light receiving device 202B receives the light P, then the result is that the RFID tag 9 is present. Otherwise, if not, then the result is that the A variation of the RFID tag sensing means 10 of the fifth embodiment can be conceived as follows. In the fifth embodiment, the light-transmitting component 10*h* is placed on the top surface of the upper half case 2A, but it may instead be placed on the either side in the direction F or on the bottom surface of the lower half case 2B.

In this variation, as with the case of the fifth embodiment, the light P from the light emitting device 202A passes through the light-transmitting component 10*h*, and is bent toward the light emitting device 202A by reflecting the RFID tag 9 of a high reflectance ratio. Finally the light P is received by the light receiving device 202B.

In this embodiment and variation thereof, as with the case of the variation of the second embodiment, the RFID tag 9 may be made of a material of a high absorption ratio. In this case, it is obvious that the reflectance ratio of the inner side of the cartridge case 2 may be adjusted in proportion to the absorption ratio of the RFID tag 9.

Sixth Embodiment

The magnetic tape cartridge 1 according to the sixth embodiment includes, as main component:
(a) the RFID tag 9; and
(b) an opening 10*i* provided as the RFID tag sensing means 10 when the RFID tag 9 is set. The opening 10*i* is placed at a predetermined position on the side of the cartridge case 2, as shown in FIG. 5A. In addition, it is preferable that the opening 10*i* does not prevent the rotation of the reel 3.

In this embodiment, an abutting member 202C is provided in the drive 200. Further, when the magnetic tape cartridge 1 is loaded into the drive 200, the presence of the RFID tag 9 can be sensed based on whether the abutting member 202C moves in response to the loading.

A description will be given below of the two cases where the RFID tag 9 is set and the opening 10*i*, i.e., the RFID tag sensing means 10 is provided on the front left side of the cartridge case 2 in the direction F, and where the RFID tag 9 is not set and the opening 10*i* is not provided at the position above. If the abutting member 202C for sensing the opening 10*i* is placed in the drive 200 in alignment with the opening 10*i*, then the drive 200 can sense whether the abutting member 202C moves when the magnetic tape cartridge 1 is loaded. Consequently, if the abutting member 202C moves, then the result is that the RFID tag 9 is present. Otherwise, if not, then the result is that the RFID tag 9 is absent.

Note that the position where the opening 10*i* is provided may be any position on the surface of the cartridge case 2 unless being near the magnetic tape drawer opening 2C. For example, the opening 10*i* may be placed on the side of the cartridge case 2 (see FIG. 5A). Alternatively, the opening 10*i* may be placed on the top or bottom surface of the cartridge case 2. Furthermore, it is preferable that a shutter member (not shown) which can open/close the opening 10*i* is provided. This is because both the states where the opening 10*i* is present and absent can be selected for convenience in accordance with the present or absent of the RFID tag 9.

As a variation of the RFID tag sensing means 10 according to the sixth embodiment, the opening 10i, i.e., the RFID tag sensing means 10 may be a recess or protrusion (not shown).

If being a recess, then the RFID tag sensing means 10 may be formed by reducing the thickness of part of the cartridge case 2 to the extent that a through hole is not formed, or by coining the cartridge case 2. Alternatively, the opening 10i or the recess may be formed to have a squire, circular or rectangular shape, or the RFID tag sensing means may be a slit. If being a protrusion, then the RFID tag sensing means 10 may be a hemispherical, columned or square protrusion. As in the case of the sixth embodiment, the presence of the RFID tag 9 can be sensed based on whether the abutting member 202C moves.

Seventh Embodiment

The magnetic tape cartridge 1 according to the seventh embodiment includes, as main components:
(a) the RFID tag 9; and
(b) the RFID tag sensing means 10 constituted of a back label 13. This back label 13 has a predetermined portion (denoted by a reference numeral 10j in FIG. 5B) which is blackened when the RFID tag 9 is set on the magnetic tape cartridge 1, as shown in FIG. 5B.

In this embodiment, the photosensor unit 202, that is, the light emitting device 202A and the light receiving device 202B can sense whether the portion 10j is blackened.

Concretely, when the portion 10j is blackened and the RFID tag 9 is set in the magnetic tape cartridge 1, if the light receiving device 202B does not receive the reflection of the light P from the light emitting device 202A, then the result is that the RFID tag 9 is present. Otherwise, if does, the result is that the RFID tag 9 is absent.

Note that the color of the portion 10j is not limited to black, and it may be any color unless reflecting the light P or greatly absorbing the light P when the light P reaches the portion 10j.

A variation of the RFID tag sensing means 10 according to the seventh embodiment, a reflection member (reflection seal) may be affixed on the portion 10j of the back label 13 when the RFID tag 9 is set in the magnetic tape cartridge 1 (FIG. 5B).

In this variation, as with the seventh embodiment, if the light receiving device 202B receives the reflection, on the reflection seal 14, of the light P from the light emitting device 202A, then the result is that the RFID tag 9 is present. Otherwise, if not, the result is that the RFID tag 9 is absent.

In this embodiment, both the back label 13 and the reflection seal 14 are formed integrally with the RFID tag 9, but each of them may be formed separately from the RFID tag 9. In addition, the portion 10j on the back label 13 formed integrally with the RFID tag 9 may be blackened beforehand, or the reflection seal 14 may be affixed on the portion 10j beforehand.

Eighth Embodiment

The magnetic tape cartridge 1 according to the eighth embodiment includes, as main components:
(a) the RFID tag 9; and
(b) the RFID tag sensing means 10 constituted of a conductive seal 15 affixed on the portion 10j (see FIG. 5B) of the back label 13 when the RFID tag 9 is set in the magnetic tape cartridge 1.

In this embodiment, if the RFID tag 9 is set in the magnetic tape cartridge 1, then the conductive seal 15 is affixed on the portion 10j. In this case, the conductivity of the surface of the portion 10j is checked by bringing plus and minus electrodes of a conductive checker (not shown) in contact with the portion 10j, thereby sensing whether the RFID tag 9 is set in the magnetic tape cartridge 1. Specifically, if the electricity is conducted on the portion 10j, then the result is that the RFID tag 9 is present. Otherwise, if not, the result is that the RFID tag 9 is absent.

It is preferable the electricity used for checking the conductivity is low enough not to affect reading/writing operation of the magnetic tape cartridge 1, such as 1.5V to 5V. It is also preferable that the cartridge case 2 is formed of an insulating resin. Furthermore, the conductive seal 15 may be a metal foil formed of a thin metal including gold, silver, copper, iron and aluminum, or may be a conductive resin. Moreover, the position where the conductive seal 15 is affixed is not limited to the portion 10j, but may be any position as long as being located on the surface of the cartridge case 2. In this case, it is natural that the electrodes (not shown) should be aligned with the conductive seal 15.

Up to this point, the description has been given of the magnetic tape cartridge 1 equipped with the RFID tag sensing means 10 according to the second to eighth embodiments of the present invention, but various modifications and variations can be conceived. For example, the light emitting device 202A or the light receiving device 202B may be placed on various positions as appropriate. The RFID tag sensing means 10 of the first to eighth embodiments may be each used alone, or they may be used in combination.

Herein, the description has been given of the case where the present invention is provided to the magnetic tape cartridge with a magnetic layer, which has the RFID tag sensing means. However, the present invention can also be provided to magnetic tape cartridges containing a recordable optical tape in which an organic dye medium and a protective layer are laminated on the base film, or a re-recordable optical tape in which a reflection layer, a magnetic layer, a dielectric layer and a protective layer are laminated on the base film.

What is claimed is:

1. A tape cartridge comprising:
   a tape-shaped recording medium;
   an RFID tag for storing management information about the tape-shaped recording medium;
   a cartridge case including upper and lower half cases and containing the tape-shaped recording medium and the RFID tag; and
   an RFID tag sensing means making it possible to sense presence of the RFID tag, said RFID tag sensing means being placed in the cartridge case.

2. The tape cartridge according to claim 1, wherein the RFID tag sensing means comprises two light-transmitting components for passing light therethrough, which are placed on a top surface of the upper half case and on a bottom surface of the lower half case, respectively, in alignment with the RFID tag.

3. The tape cartridge according to claim 1, wherein the RFID tag sensing means comprises two light-transmitting components for passing light therethrough, which are placed on a top surface of the upper half case or on a bottom surface of the lower half case, and on a side of the cartridge case, respectively, in alignment with the RFID tag.

4. The tape cartridge according to claim 3,
wherein the RFID tag is made of a base material with a reflectance ratio of at least 0.7.

5. The tape cartridge according to claim 3,
wherein the RFID tag is set in the cartridge case to reflect light incident from one of the light-transmitting components to the other.

6. The tape cartridge according to claim 4,
wherein the RFID tag is set in the cartridge ease to reflect light incident from one of the light-transmitting components to the other.

7. The tape cartridge according to claim 1,
wherein the RFID tag sensing means comprises a light-transmitting component placed on a top, bottom or side surface of the cartridge case, and
wherein the RFID tag is set parallel to the light-transmitting component.

8. The tape cartridge according to claim 7,
wherein the RFID tag is made of a base material with a low reflectance ratio, and
wherein the cartridge case comprises a support portion within for supporting the RFID tag, and said support portion is made of a base material with a high reflectance ratio.

9. The tape cartridge according to claim 7,
wherein the RFID tag is made of a base material with a reflectance ratio of at most 0.3, and
wherein the cartridge case comprises a support portion within for supporting the RFID tag, and said support portion is made of a base material with a reflectance ratio of at least 0.7.

10. The tape cartridge according to claim 1,
wherein the RFID tag sensing means comprises an opening provided in a predetermined location of the cartridge case.

11. The tape cartridge according to claim 1,
wherein the RFID tag sensing means comprises a recess provided in a predetermined location of the cartridge case.

12. The tape cartridge according to claim 1,
wherein the RFID tag sensing means comprises a protrusion provided on a predetermined location of the cartridge case.

13. The tape cartridge according to claim 1,
wherein the RFID tag sensing means comprises a predetermined portion which is positioned on a back label or on a surface of the cartridge case and which is colored in black or in a specific color.

14. The tape cartridge according to claim 1,
wherein the RFID tag sensing means comprises a reflective material placed on a back label or on a surface of the cartridge case.

15. The tape cartridge according to claim 14,
wherein the reflective material comprises a reflective seal.

16. The tape cartridge according to claim 14,
wherein the reflective material comprises a reflective seat.

17. The tape cartridge according to claim 1,
wherein the RFID tag sensing means comprises a conductive material placed on a back label or on a surface of the cartridge case.

18. The tape cartridge according to claim 17,
wherein the conductive material comprises a conductive seal.

19. The tape cartridge according to claim 17,
wherein the conductive material comprises a conductive seat.

20. A method for confirming condition of an RFID tag in a tape cartridge, the tape cartridge including a tape-shaped recording medium, the RFID tag for storing management information about the tape-shaped recording medium, a cartridge case containing the tape-shaped recording medium and the RFID tag, and an RFID tag sensing means which senses the presence of th RFID tag, the RFID tag sensing means being set in the cartridge case, said method comprising:
confirming whether the RFID tag is present, with the RFID tag sensing means;
confirming whether the RFID tag is present, with an RFID reader/writer;
comparing results of the confirmation of the RFID tag sensing means and the reader/writer; and
determining, based on the comparison result, whether the RFID tag is present, and whether the RFID tag fails or whether the RFID tag has specifications different from those of the RFID reader/writer.

21. A method for confirming a condition of an RFID tag in a tape cartridge, the tape cartridge including comprising a tape-shaped recording medium, the RFID tag for storing management information about the tape-shaped recording medium, a cartridge case containing the tape-shaped recording medium and the RFID tag, and an RFID tag sensing means which senses the presence of the RFID tag, the RFID tag sensing means being set in the cartridge case, said method comprising:
confirming whether the RFID tag is present, with the RFID tag sensing means;
confirming whether the RFID tag is present, with an RFID reader/writer; and
comparing results of the confirmation of the RFID tag sensing means and the reader/writer and, when the results are different from each other, determining that the RFID tag fails or has specifications different from specifications of the RFID reader/writer.

* * * * *